United States Patent
Yang et al.

(10) Patent No.: US 10,498,497 B2
(45) Date of Patent: Dec. 3, 2019

(54) BROADCAST SIGNAL TRANSMITTING DEVICE, BROADCAST SIGNAL RECEIVING DEVICE, BROADCAST SIGNAL TRANSMITTING METHOD AND BROADCAST SIGNAL RECEIVING METHOD

(71) Applicant: LG ELECTRONICS INC., Seoul (KR)

(72) Inventors: Suckchel Yang, Seoul (KR); Joonkui Ahn, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/747,006

(22) PCT Filed: Sep. 9, 2016

(86) PCT No.: PCT/KR2016/010169
§ 371 (c)(1),
(2) Date: Jan. 23, 2018

(87) PCT Pub. No.: WO2017/043916
PCT Pub. Date: Mar. 16, 2017

(65) Prior Publication Data
US 2018/0212717 A1    Jul. 26, 2018

Related U.S. Application Data

(60) Provisional application No. 62/216,356, filed on Sep. 9, 2015, provisional application No. 62/219,645, filed
(Continued)

(51) Int. Cl.
*H04L 1/18* (2006.01)
*H04L 5/00* (2006.01)
(Continued)

(52) U.S. Cl.
CPC .......... *H04L 1/1812* (2013.01); *H04L 1/1861* (2013.01); *H04L 5/00* (2013.01);
(Continued)

(58) Field of Classification Search
CPC ..................................... H04L 1/1812
See application file for complete search history.

(56) References Cited

U.S. PATENT DOCUMENTS

2012/0320805 A1* 12/2012 Yang ................... H04L 1/18
370/280
2016/0295561 A1* 10/2016 Papasakellariou .. H04W 72/042
(Continued)

FOREIGN PATENT DOCUMENTS

KR    10-2012-0101370 A    9/2012
KR    10-2013-0113917 A    10/2013
(Continued)

OTHER PUBLICATIONS

Intel Corporation, "HARQ-ACK feedback for CA with up to 32 CCs," 3GPP TSG-RAN WG1 #81, R1-152625, Fukuoka, Japan, May 25-29, 2015 (downloaded by EPO on May 24, 2015), pp. 1-4, XP050973841.

*Primary Examiner* — Jason E Mattis
(74) *Attorney, Agent, or Firm* — Birch, Stewart, Kolasch & Birch, LLP

(57) ABSTRACT

The present invention relates to a method and an apparatus for transmitting a signal in a wireless communication system. A physical downlink control channel (PDCCH) is received that has a downlink assignment index (DAI) and DAI group indication information within a subframe (SF) #n-k. A hybrid automatic repeat request acknowledgement (HARQ-ACK) payload is configured by using the DAI and the DAI group indication information. The HARQ-ACK payload is transmitted from an SF #n. A value of the DAI includes a scheduling order value in a cell/SF unit associated
(Continued)

with the PDCCH in the SF #n−k. The scheduling order value in a cell/SF unit is counted in a cell-priority manner in a cell/SF domain. The DAI group indication information includes whether the PDCCH is related to a last DAI group, and one DAI group consists of a plurality of consecutive DAI values.

6 Claims, 16 Drawing Sheets

Related U.S. Application Data on Sep. 16, 2015, provisional application No. 62/250,497, filed on Nov. 3, 2015.

(51) Int. Cl.
*H04W 76/28* (2018.01)
*H04W 72/04* (2009.01)

(52) U.S. Cl.
CPC ........... *H04L 5/0055* (2013.01); *H04W 76/28* (2018.02); *H04W 72/042* (2013.01)

(56) References Cited

U.S. PATENT DOCUMENTS

| 2018/0241510 A1* | 8/2018 | Shen | H04L 1/18 |
| 2018/0242286 A1* | 8/2018 | Song | H04L 1/0072 |

FOREIGN PATENT DOCUMENTS

| KR | 10-2014-0070526 A | 6/2014 |
| KR | 10-2015-0051063 A | 5/2015 |
| KR | 10-2015-0089002 A | 8/2015 |
| WO | WO 2016/118240 A1 | 7/2016 |
| WO | WO 2016/163758 A1 | 10/2016 |
| WO | WO 2017/028001 A1 | 2/2017 |

* cited by examiner

Reuse of LTE PUCCH format 2 (normal CP case)

BROADCAST SIGNAL TRANSMITTING DEVICE, BROADCAST SIGNAL RECEIVING DEVICE, BROADCAST SIGNAL TRANSMITTING METHOD AND BROADCAST SIGNAL RECEIVING METHOD

CROSS REFERENCE TO RELATED APPLICATIONS

This application is the National Phase of PCT International Application No. PCT/KR2016/010169, filed on Sep. 9, 2016, which claims priority under 35 U.S.C. 119(e) to U.S. Provisional Application No. 62/216,356, filed on Sep. 9, 2015, No. 62/219,645, filed on Sep. 16, 2015, and No. 62/250,497, filed on Nov. 3, 2015, all of which are hereby expressly incorporated by reference into the present application.

TECHNICAL FIELD

The present invention relates to a wireless communication system, and more specifically, to methods and devices for transmitting/receiving signals. The wireless communication system can support carrier aggregation (CA).

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

DISCLOSURE

Technical Problem

An object of the present invention devised to solve the problem lies in a method and apparatus for efficiently transmitting signals in a wireless communication system.

Another object of the present invention devised to solve the problem lies in a method and apparatus for efficiently controlling transmission of uplink signals.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

According to one aspect of the present invention, a method of transmitting HARQ-ACK (hybrid automatic repeat request) by a UE in a wireless communication system includes: receiving a PDCCH (physical downlink control channel) having a DAI (downlink assignment index) and DAI group indication information within an SF (subframe) #n-k; configuring a HARQ-ACK payload using the DAI and the DAI group indication information; and transmitting the HARQ-ACK payload in an SF #n, wherein the value of the DAI indicates a scheduling order value in a cell/SF unit associated with a first PDCCH in the SF #n-k, the scheduling order value in a cell/SF unit is counted in a cell first manner in a cell/SF domain, the DAI group indication information indicates whether the PDCCH corresponds to a last DAI group, one DAI group is composed of a plurality of consecutive DAI values, and K: $\{k_0, k_1, \ldots k_{M-1}\}$ is given as below in each cell.

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

According to another aspect of the present invention, a UE configured to transmit HARQ-ACK (hybrid automatic repeat request) in a wireless communication system includes: a radio frequency (RF) unit; and a processor, wherein the processor is configured: to receive a PDCCH (physical downlink control channel) having a DAI (downlink assignment index) and DAI group indication information within an SF (subframe) #n-k; to configure a HARQ-ACK payload using the DAI and the DAI group indication information; and to transmit the HARQ-ACK payload in an SF #n, wherein the value of the DAI indicates a scheduling order value in a cell/SF unit associated with a first PDCCH in the SF #n-k, the scheduling order value in a cell/SF unit is counted in a cell first manner in a cell/SF domain, the DAI group indication information indicates whether the PDCCH corresponds to a last DAI group, one DAI group is composed of a plurality of consecutive DAI values, and K: $\{k_0, k_1, \ldots k_{M-1}\}$ is given as below in each cell.

| TDD UL-DL Configuration | 0 | 1 | 2 | 3 | 4 | 5 | 6 | 7 | 8 | 9 |
|---|---|---|---|---|---|---|---|---|---|---|
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Preferably, 4 values of the DAI may be circularly repeated and the one DAI group may be composed of 4 consecutive DAI values.

Preferably, when a PDCCH corresponding to the last DAI group is not detected in the SF #n–k, the HARQ-ACK payload may further include a HARQ-ACK response corresponding to the last DAI group, and the HARQ-ACK response may be set to NACK (Negative Acknowledgement) or DTX (Discontinuous Transmission).

Preferably, the PDCCH may be a PDCCH scheduling (i) a PDSCH (physical downlink shared channel) or (ii) a PDCCH indicating SPS (semi-persistent scheduling) release.

Preferably, the HARQ-ACK payload may include an HARQ-ACK response to the PDSCH or a HARQ-ACK response to the PDCCH indicating the SPS release.

Advantageous Effects

According to the present invention, signals can be efficiently transmitted/received in a wireless communication system. In addition, transmission of uplink signals can be efficiently controlled.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, a Global System for Mobile communications (GSM), a General Packet Radio Service (GPRS), an Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of a Universal Mobile Telecommunications System (UMTS). 3rd Generation Partnership Project (3GPP) Long Term Evolution (LTE) is a part of an Evolved UMTS (E-UMTS) that uses an E-UTRA. The LTE-Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

In a wireless communication system, a UE receives information from a BS on downlink (DL) and transmits information to the BS on uplink (UL). Information transmitted/received between the UE and BS includes data and various types of control information, and various physical channels are present according to type/purpose of information transmitted/received between the UE and BS.

Figure 1:
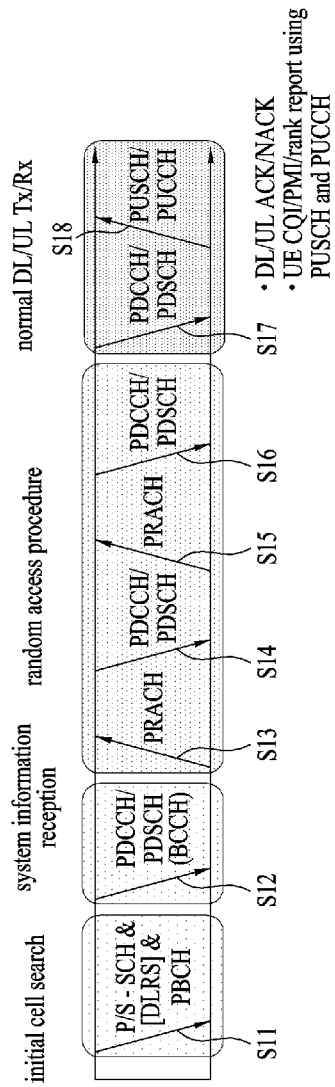
FIG. 1 is a conceptual diagram illustrating physical channels used in a 3GPP LTE system acting as an exemplary mobile communication system and a general method for transmitting a signal using the physical channels.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement (ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
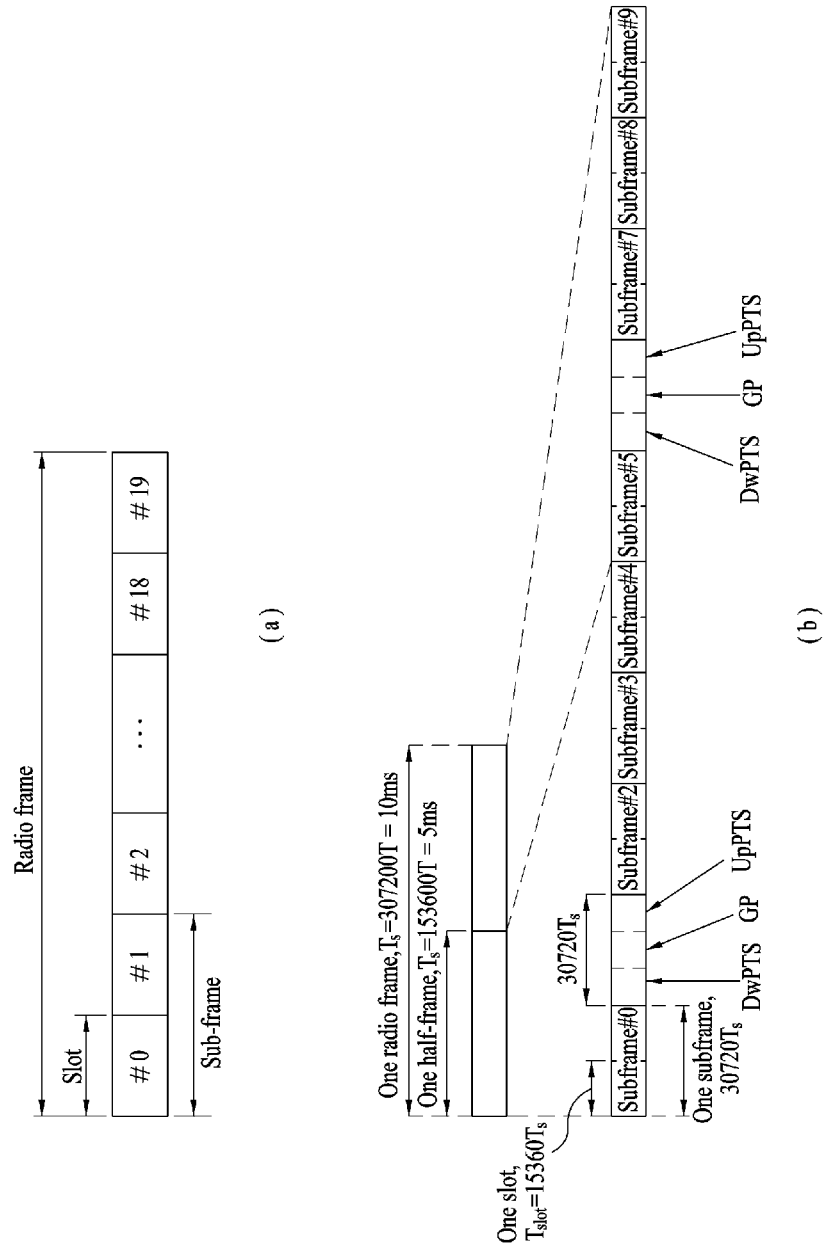
FIG. 2 is a diagram illustrating a structure of a radio frame.

FIG. 2 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 1(0) special subframe. Normal subframes are used for an uplink or a downlink according to UL-DL configuration. A subframe includes 2 slots.

Table 1 shows subframe configurations in a radio frame according to UL-DL configuration.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE. UpPTS is used for channel estimation in a BS and UL transmission synchronization acquisition in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
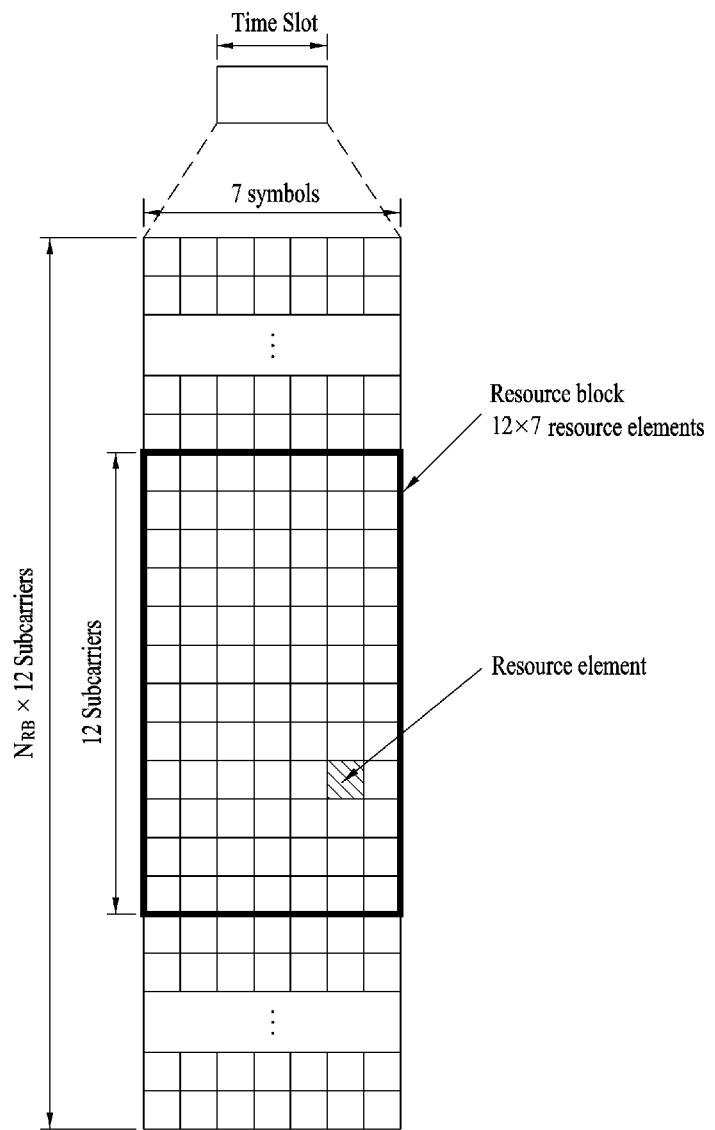
FIG. 3 exemplarily shows a resource grid of a downlink slot.

FIG. 3 illustrates a resource grid of a downlink slot.

Referring to FIG. 3, a downlink slot includes a plurality of OFDM symbols in the time domain. One downlink slot may include 7 OFDM symbols, and one resource block (RB) may include 12 subcarriers in the frequency domain. However, the present invention is not limited thereto. Each element on the resource grid is referred to as a resource element (RE). One RB includes 12×7 REs. The number $N^{DL}$ of RBs included in the downlink slot depends on a downlink transmit bandwidth. The structure of an uplink slot may be same as that of the downlink slot.

Figure 4:
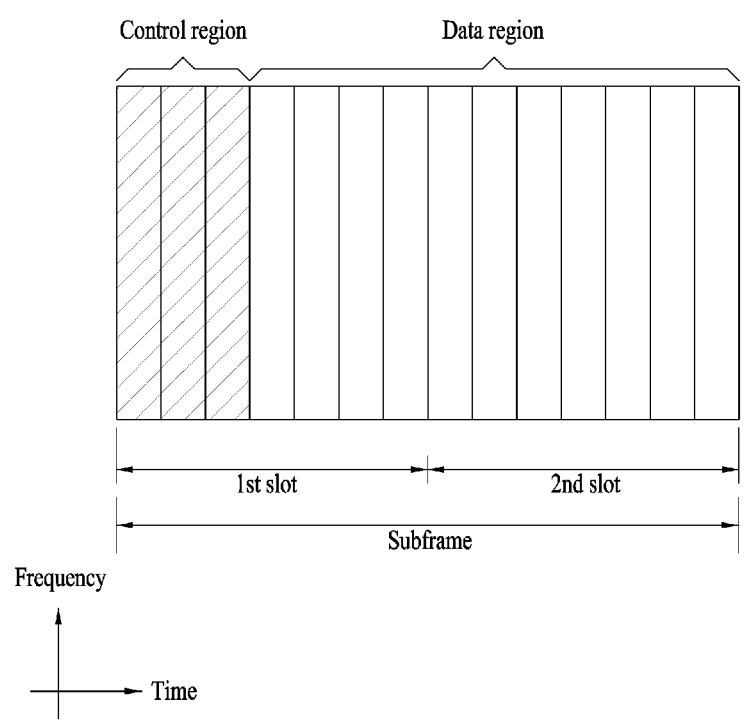
FIG. 4 illustrates a downlink frame structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UIE group.

Control information transmitted through a PDCCH is referred to as DCI. Formats 0, 3, 3A and 4 for uplink and formats 1, 1A, 1B, 1C, 1D, 2, 2A, 2B and 2C for downlink are defined as DCI formats. Information field types, the number of information fields and the number of bits of each information field depend on DCI format. For example, the DCI formats selectively include information such as hopping flag, RB allocation, MCS (modulation coding scheme), RV (redundancy version), NDI (new data indicator), TPC (transmit power control), HARQ process number, PMI (precoding matrix indicator) confirmation as necessary. A DCI format can be used to transmit control information of two or more types. For example, DCI format 0/1A is used to carry DCI format 0 or DCI format 1, which are discriminated from each other by a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI, and generally, a plurality of PDCCHs is transmitted in a subframe. Each PDCCH is transmitted using one or more CCEs. One CCE corresponds to nine REGs, and one REG corresponds to four REs. Four QPSK symbols are mapped to each REG. The resource element occupied by the reference signal is not included in the REG. Thus, the number of REGs within a given OFDM symbol depends on the presence or absence of a cell-specific reference signal. The REG concept is also used for other downlink control channels (i.e., PDFICH and PHICH). As shown in Table 2, four PDCCH formats are supported.

TABLE 2

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by the BS according to the channel state. For example, one CCE may be required for a PDCCH for a UE (for example, adjacent to the BS) having a good downlink channel. However, in case of a PDCCH for a UE (for example, located near the cell edge) having a poor channel, eight CCEs may be required to obtain sufficient robustness. Additionally, the power level of the PDCCH may be adjusted according to the channel state.

In LTE, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. One PDCCH candidate corresponds to 1, 2, 4 or 8 CCEs according to the CCE set level. The BS transmits an actual PDCCH (DCI) on a PDCCH candidate in a search space and the UE monitors the search space to detect the PDCCH (DCI). Specifically, the UE attempts blind decoding (BD) on the PDCCH candidates in the search space.

In LTE, SSs for respective PDCCH formats may have different sizes. A dedicated SS and a common SS are defined. A dedicated SS (or UE-specific SS (USS)) and a common SS (Common SS (CSS)) are defined. The dedicated search space is configured for each individual UE, and all UEs are provided with information about the range of the common SS. The dedicated SS and the common SS may overlap for a given UE.

Since the SSs are small in size and may overlap each other, the base station may not be able to find a CCE resource for sending a PDCCH to all desired UEs in a given subframe. This is because CCE resources have already been allocated to other UEs, and there may be no more CCE resources for a specific UE in the search space of the specific UE (blocking). In order to minimize the possibility of blocking to be continued in the next subframe, a UE-specific hopping sequence is applied to the start position of the dedicated SS. Table 3 shows the sizes of common and dedicated SSs.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To put the computational load according to attempts of blind decoding under control, the UE does not simultaneously search all defined DCI formats. In general, in a dedicated search space, the UE always searches formats 0 and 1A. Formats 0 and 1A have the same size and are distinguished by flags in the message. In addition, the UE may be further required to receive another format (i.e., format 1, 1B or 2 depending on the PDSCH transmission mode set by the base station). In the common search space, the UE searches formats 1A and 1C. In addition, the UE may be configured to search format 3 or 3A. Formats 3 and 3A have the same size as in the case of format 0/1A, and are distinguished according to whether they have a CRC scrambled with another (common) identifier. Transmission modes and information content of DCI formats for configuring a multi-antenna technology are as follows.

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO
Transmission mode 6: Closed-loop rank-1 precoding
Transmission mode 7: Transmission using UE-specific reference signals DCI Format
Format 0: Resource grants for the PUSCH transmissions (uplink)
Format 1: Resource assignments for single codeword PDSCH transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an uplink subframe structure used in LTE.

Figure 5:
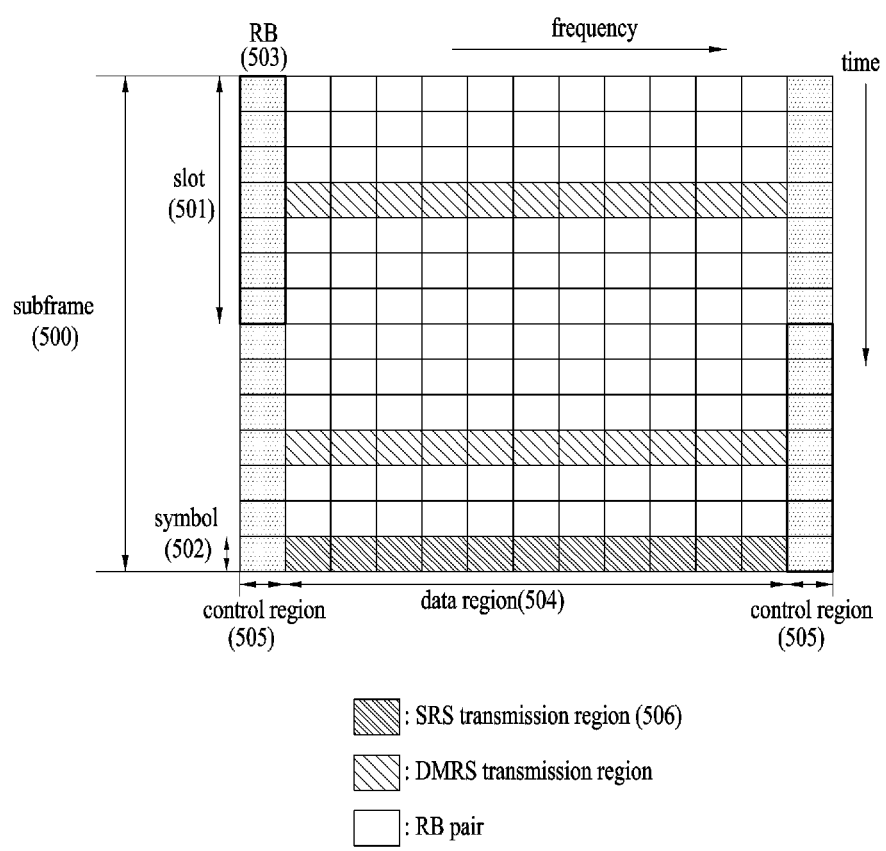
FIG. 5 illustrates an uplink subframe structure.

Referring to FIG. 5, a subframe 500 includes two 0.5 ms slots 501. When a normal CP is used, each slot includes 7 symbols 502 each corresponding to an SC-FDMA symbol. A resource block 503 is a resource allocation unit corresponding to 12 subcarriers in the frequency domain and to a slot in the time domain. The uplink subframe is divided into a data region 504 and a control region 505. The data region refers to a communication resource used for a UE to transmit data such as audio data, packets, etc. and includes a PUSCH (physical uplink shared channel). The control region refers to a communication resource used for the UE to transmit uplink control information (UCI) and includes a PUCCH (physical uplink control channel).

The PUCCH can be used to transmit the following control information.

SR (scheduling request): This is information used to request a UL-SCH resource and is transmitted using On-Off Keying (OOK) scheme.

HARQ ACK: This is a response to a downlink data packet (e.g. codeword) on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. A HARQ-ACK response includes positive ACK (simply, ACK), negative ACK (NACK), DTX or NACK/DTX. Here, HARQ-ACK is used interchangeably with HARQ ACK/NACK and ACK/NACK.

CSI (channel state information): This is feedback information about a downlink channel. Feedback information regarding multiple input multiple output (MIMO) includes rank indicator (RI) and precoding matrix index (PMI). 20 bits are used for each subframe.

The quantity of control information that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE(-A).

TABLE 4

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | Up to 24-bit HARQ ACK/NACK + SR |

An SRS is transmitted through the last SC-FDMA symbol of the subframe (506). SRSs of multiple UEs, transmitted through the same SC-FDMA symbol, can be discriminated according to frequency position/sequence. The SRS is transmitted aperiodically or periodically.

Figure 6:
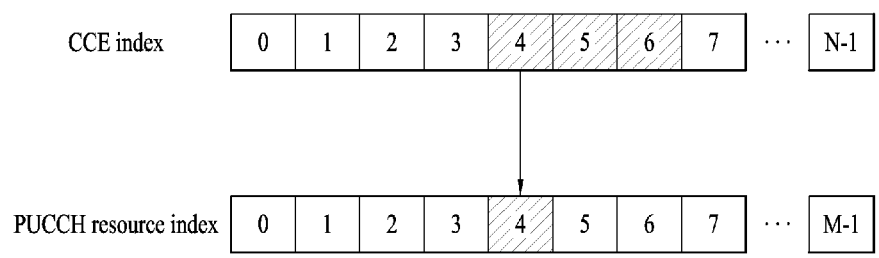
FIG. 6 shows an example for deciding PUCCH resources for ACK/NACK.

FIG. 6 shows an example for deciding PUCCH resources for ACK/NACK. In the LTE system, PUCCH resources for ACK/NACK are not pre-allocated to each UE, and several UEs located in the cell are configured to divisionally use several PUCCH resources at every time point. In more detail, PUCCH resources used for ACK/NACK transmission of a UE may correspond to a PDCCH that carries scheduling information of the corresponding DL data. The entire region to which a PDCCH is transmitted in each DL subframe is comprised of a plurality of Control Channel Elements (CCEs), and a PDCCH transmitted to the UE is comprised of one or more CCEs. The UE may transmit ACK/NACK through PUCCH resources (e.g., first CCE) from among CCEs constructing a PDCCH received by the UE.

Referring to FIG. 6, each block in a Downlink Component Carrier (DL CC) represents a CCE and each block in an Uplink Component Carrier (UL CC) indicates a PUCCH resource. Each PUCCH resource index may correspond to a PUCCH resource for an ACK/NACK signal. If information on a PDSCH is delivered on a PDCCH composed of CCEs #4~#6, as shown in FIG. 6, a UE transmits an ACK/NACK signal on PUCCH #4 corresponding to CCE #4, the first CCE of the PDCCH. FIG. 6 illustrates a case in which a maximum of M PUCCHs are present in the UL CC when a maximum of N CCEs exist in the DL CC. Though N may be identical to M (M=M), N may differ from M and CCEs may be mapped to PUCCHs in an overlapped manner.

is transmitted through a PUCCH basically, ACK/NACK is transmitted through a PUSCH when a PUSCH is transmitted at ACK/NACK transmission time. Various PUCCH formats shown in Table 4 can be used for ACK/NACK transmission. To reduce the number of ACK/NACK bits transmitted through a PUCCH format, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 5 shows DASI (K: $\{k_0, k_1, \ldots, k_{M-1}\}$) defined in LTE(-A). Table 3 shows spacing between a UL subframe transmitting ACK/NACK and a DL subframe relating to the UL subframe. Specifically, when a PDCCH that indicates PDSCH transmission and/or SPS release is present in a subframe n−k (k∈K), the UE transmits ACK/NACK in a subframe n.

TABLE 5

| TDD UL-DL | Subframe n | | | | | | | | | |
|---|---|---|---|---|---|---|---|---|---|---|
| Configuration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Specifically, a PUCCH resource index in an LTE system is determined as follows.

$$n^{(1)}_{PUCCH} = n_{CCE} + N^{(1)}_{PUCCH} \quad \text{[Equation 1]}$$

Here, $n^{(1)}_{PUCCH}$ represents a resource index of PUCCH format 1 for ACK/NACK/DTX transmission, $N^{(1)}_{PUCCH}$ denotes a signaling value received from a higher layer, and $n_{CCE}$ denotes the smallest value of CCE indexes used for PDCCH transmission. A cyclic shift (CS), an orthogonal spreading code and a Physical Resource Block (PRB) for PUCCH formats 1a/1b are obtained from $n^{(1)}_{PUCCH}$.

A description will be given of TDD signal transmission timing in a single carrier (or cell) situation with reference to FIGS. 7 to 8.

Figure 7:
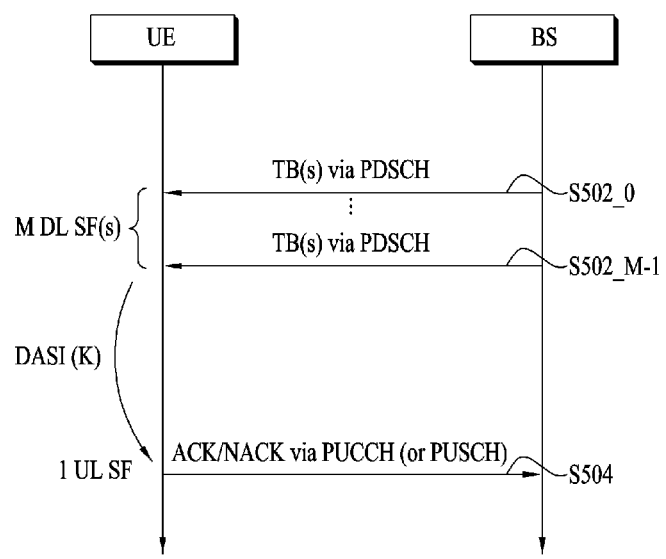
FIGS. 7-8 show a TDD Uplink Acknowledgement/Negative Acknowledgement (UL ACK/NACK) transmission timing in a single cell situation.
Figure 8:
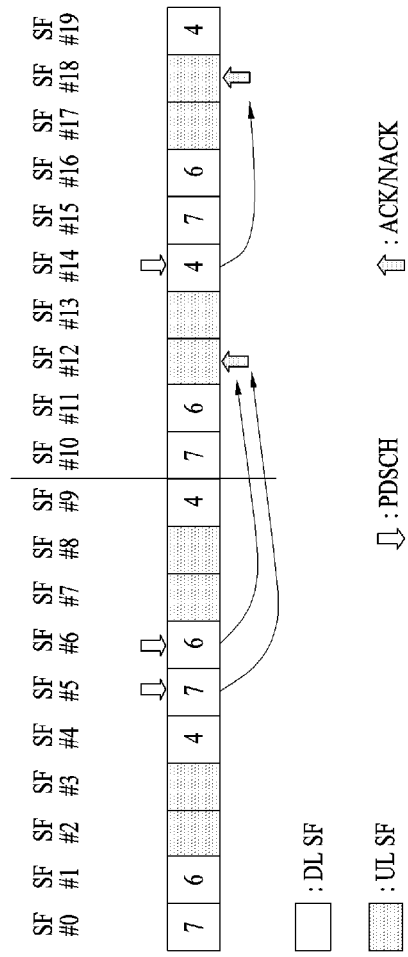

FIGS. 7~8 illustrate PDSCH-UL ACK/NACK timing. Here, UL ACK/NACK means ACK/NACK transmitted on uplink, as a response to DL data (e.g. PDSCH).

Referring to FIG. 7, a UE can receive one or more PDSCH signals in M DL subframes (SFs) (S502_0 to S502_M−1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK FIG. 8 illustrates UL ACK/NACK transmission timing when UL-DL configuration #1 is configured. In the figure, SF#0 to #9 and SF#10 to #19 respectively correspond to radio frames, and numerals in blocks denote UL subframes relating to DL subframes. For example, ACK/NACK for a PDSCH of SF#5 is transmitted in SF#5+7 (=SF#12) and ACK/NACK for a PDSCH of SF#6 is transmitted in SF#6+6 (=SF#12). Accordingly, both ACKs/NACKs for DL signals of SF#5/#6 are transmitted in SF#12. Similarly, ACK/NACK for a PDSCH of SF#14 is transmitted in SF#14+4 (=SF#18).

When a UE transmits an ACK/NACK signal to a BS according to the TDD scheme, the following problems may occur.

If a UE misses at least one of PDCCH(s) transmitted from a BS during an interval of subframes, the UE does not even recognize whether a PDSCH corresponding to the missing PDCCH is transmitted to the UE, resulting in the occurrence of errors in ACK/NACK generation.

In order to solve the above-mentioned errors, the TDD system includes a downlink assignment index (DAI) in a PDCCH. DAI indicates an accumulative value (i.e., a counting value) of PDCCH(s) corresponding to PDSCH(s) and PDCCH(s) indicating DL SPS release up to a current subframe within DL subframe(s) n−k (k ∈ K). For example, if three DL subframes are mapped to one UL subframe, PDSCHs transmitted in 3 DL subframe intervals are sequentially indexed (i.e., sequentially counted), and the indexed result is loaded on a PDCCH that schedules a PDSCH. As a result, the UE can recognize whether a PDCCH has been normally received on the basis of DAI information contained in the PDCCH.

Figure 9:
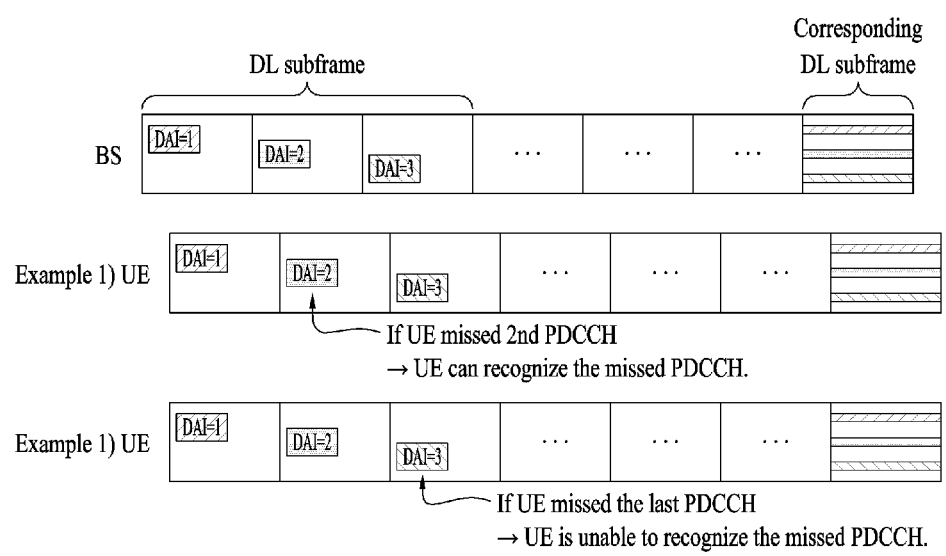
FIG. 9 illustrates an ACK/NACK transmission using Downlink Assignment Index (DAI).

FIG. 9 exemplarily shows ACK/NACK transmission using a DAI. For example, according to the TDD system shown in FIG. 9, one UL subframe is mapped to three DL subframes (i.e., 3 DL subframes:1 UL subframe). For convenience of description, it is assumed that the UE transmits an ACK/NACK signal using a PUCCH resource corresponding to the last detected PDCCH.

The first example of FIG. 9 shows that a UE missed a second PDCCH. Since a DAI value (DAI=3) of a third PDCCH is different from the number (i.e., 2) of received PDCCHs, the UE recognizes that the second PDCCH has been missed. In this case, the UE transmits ACK/NACK information using PUCCH resources corresponding to DAI=3, and an ACK/NACK response to the second PDCCH may be indicated by NACK (or NACK/DTX). In contrast, if the UE has missed the last PDCCH as shown in the second example, the UE is unable to recognize the absence (i.e., missing) of the last PDCCH because a DAI index of the last received PDCCH is identical to the number of received PDCCHs. Therefore, the UE recognizes that only two PDCCHs have been scheduled during the DL subframe. The UE transmits ACK/NACK information using PUCCH resources corresponding to DAI=2, such that the BS can recognize absence of a PDCCH including DAI=3.

Figure 10:
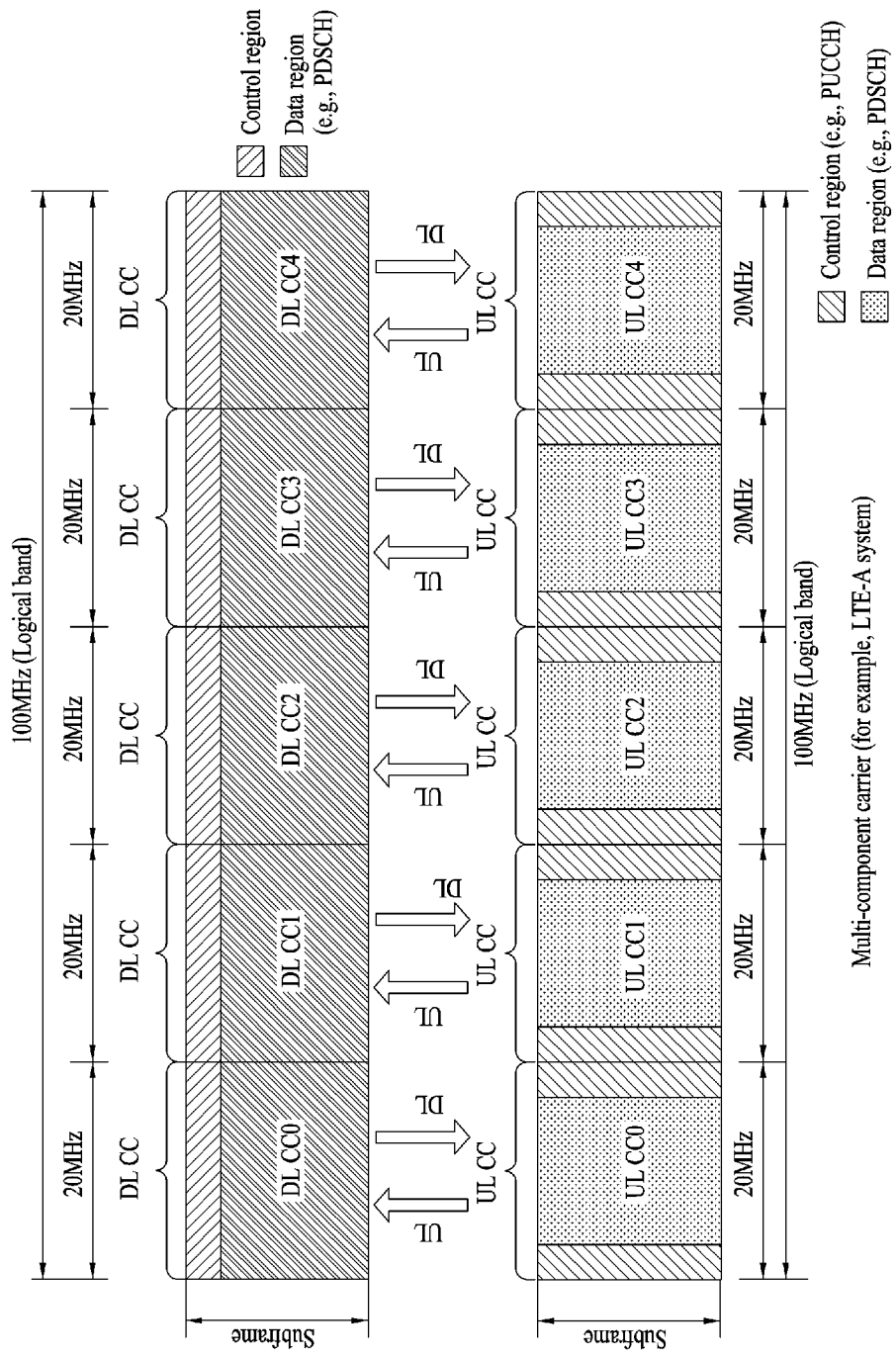
FIG. 10 exemplarily shows a carrier aggregation (CA) communication system.

FIG. 10 exemplarily shows a carrier aggregation (CA) communication system. The LTE-A system is designed to use a carrier aggregation or bandwidth aggregation technique using a plurality of UL/DL frequency blocks so as to use a wider frequency band. Each frequency block is transmitted using a component carrier (CC). The CC may be regarded as a carrier frequency (or center carrier, center frequency) for the frequency block.

Referring to FIG. 10, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

LTE-A uses the concept of a cell so as to manage radio resources. The cell is defined as a combination of DL resources and UL resources. Here, the UL resources are not an essential part. Accordingly, the cell can be configured with DL resources only, or DL resources and UL resources. When CA is supported, the linkage between a carrier frequency (or DL CC) of a DL resource and a carrier frequency (or UL CC) of a UL resource can be designated by system information. A cell operating at a primary frequency (or PCC) can be referred to as a Primary Cell (PCell) and a cell operating at a secondary frequency (or SCC) can be referred to as a Secondary Cell (SCell). The PCell is used for a UE to perform an initial connection establishment procedure or a connection re-establishment procedure. The PCell may refer to a cell designated during a handover procedure. The SCell can be configured after RRC connection is established and used to provide additional radio resources. The PCell and the SCell can be called a serving cell. Accordingly, for a UE that does not support CA while in an RRC_connected state, only one serving cell configured with a PCell exists. Conversely, for a UE that is in an RRC_Connected state and supports CA, one or more serving cells including a PCell and a SCell are provided. For CA, a network can configure one or more SCells for a UE that supports CA in addition to a PCell initially configured during a connection establishment procedure after an initial security activation procedure.

When cross-carrier scheduling (or cross-CC scheduling) is applied, a PDCCH for DL allocation can be transmitted through DL CC#0 and a PDSCH corresponding thereto can be transmitted through DL CC#2. For cross-CC scheduling, introduction of a Carrier Indicator Field (CIF) may be considered. The presence or absence of a CIF in a PDCCH can be set semi-statically and UE-specifically (or UE-group-specifically) according to higher layer signaling (e.g. RRC signaling). The base line of PDCCH transmission is summarized as follows.

CIF disabled: PDCCH on a DL CC allocates a PDSCH resource on the same DL CC or allocates a PUSCH resource on a linked UL CC.

CIF enabled: PDCCH on a DL CC can allocate a PDSCH or a PUSCH on a specific UL/DL CC from among a plurality of aggregated DL/UL CCs using the CIF.

When a CIF is present, a BS can allocate a PDCCH monitoring DL CC set in order to reduce BD complexity of a UE. The PDCCH monitoring DL CC set includes one or more DL CCs as part of aggregated DL CCs, and the UE detects/decodes a PDCCH only on DL CCs corresponding to the DL CC set. That is, if the BS schedules PDSCH/PUSCH for the UE, the PDCCH is transmitted only through a PDCCH monitoring DL CC set. The PDCCH monitoring DL CC set can be determined UE-specifically, UE-group-specifically or cell-specifically. The term "PDCCH monitoring DL CC" can be replaced by equivalent terms "monitoring carrier", "monitoring cell", etc. In addition, the term "aggregated CC" for a UE can be replaced by terms "serving CC", "serving carrier", "serving cell", etc.

Figure 11:
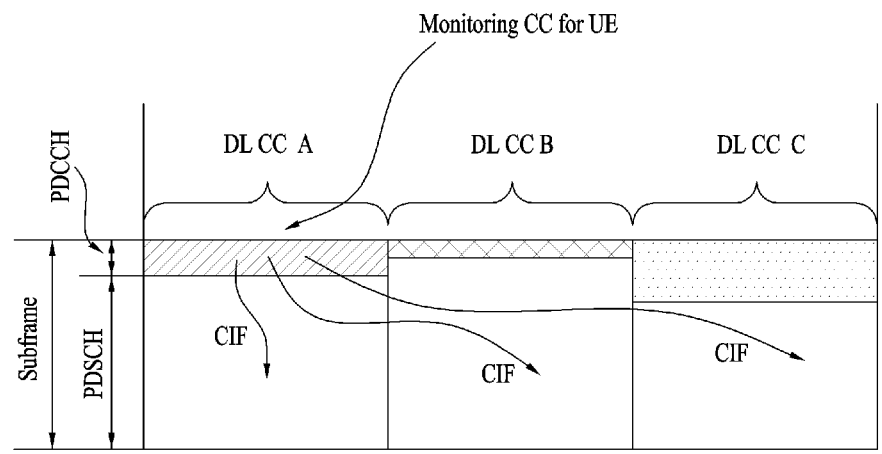
FIG. 11 exemplarily shows cross-carrier scheduling when a plurality of carriers are aggregated.

FIG. 11 illustrates scheduling when a plurality of carriers is aggregated. It is assumed that 3 DL CCs are aggregated and DL CC A is set to a PDCCH monitoring DL CC. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF. When the CIF is enabled according to UE-specific (or UE-group-specific or cell-specific) higher layer signaling, DL CC A (monitoring DL CC) can transmit not only a PDCCH that schedules the PDSCH corresponding to the DL CC A but also PDCCHs that schedule PDSCHs of other DL CCs. In this case, DL CC B and DL CC C that are not set to a PDCCH monitoring DL CCs do not deliver PDCCHs.

LTE-A considers transmission of a plurality of ACK/NACK information/signals with respect to a plurality of PDSCHs, which are transmitted through a plurality of DL CCs, through a specific UL CC. To achieve this, it can be considered to joint-code (Reed-Muller code, Tail-biting convolutional code, etc.) a plurality of ACK/NACKs and transmit a plurality of ACK/NACK information/signals using PUCCH format 2, or a new PUCCH format (referred to as an Enhanced PUCCH (E-PUCCH) or PUCCH format M), distinguished from ACK/NACK transmission using PUCCH format 1a/1b in the legacy LTE system. The E-PUCCH format includes the following block-spreading based PUCCH format. After joint coding, ACK/NACK transmission using E-PUCCH format is exemplary, and E-PUCCH format may be used without being limited to UCI transmission. For example, E-PUCCH format may be used to transmit ACK/NACK, CSI (e.g. CQI, PMI, RI, PTI, etc.), SR, or two or more thereof. Accordingly, E-PUCCH format may be used to transmit joint-coded UCI codewords irrespective of type/number/size of UCI.

Figure 12:
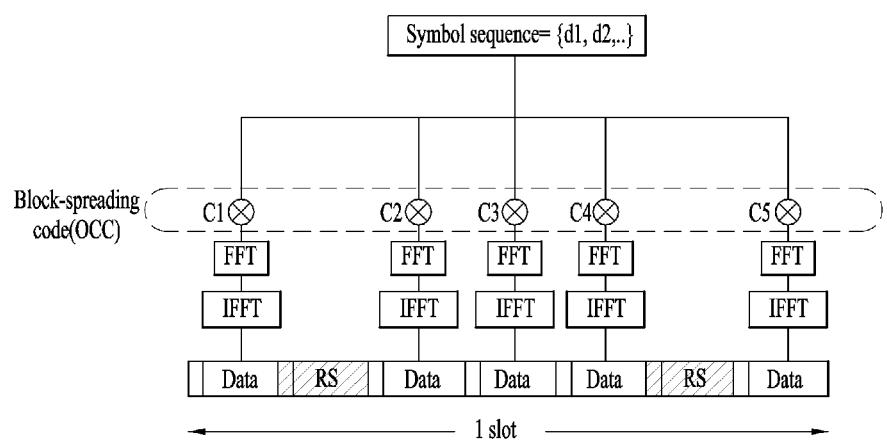
FIGS. 12-13 show an example of PUCCH format 3.

FIG. 12 illustrates a slot level structure of PUCCH format 3. PUCCH format 3 is used to transmit a plurality of ACK/NACK information/signals for a plurality of PDSCHs transmitted through a plurality of DL CCs. PUCCH format 3 may be used to transmit ACK/NACK, CSI (e.g., CQI, PMI, RI, PTI, etc.), SR, or two or more of these information items together.

Referring to FIG. 12, five SC-FDMA symbols (i.e., a UCI data part) are generated from one symbol sequence ({d1, d2, . . . }) using OCC (C1 to C5) of length –5 (SF (Spreading Factor)=5). The symbol sequence {d1, d2, . . . } may refer to a modulation symbol sequence or a codeword bit sequence. When the symbol sequence ({d1, d2, . . . }) refers to a codeword bit sequence, the block diagram of FIG. 12 further includes a modulation block. The RS symbol may be generated from a CAZAC sequence having a specific cyclic shift. The RS may be transmitted in a form in which a specific OCC is applied to (multiplied by) a plurality of RS symbols in the time domain. The block-spread UCI is transmitted to the network through an FFT (Fast Fourier Transform) process and an IFFT (Inverse Fast Fourier Transform) process on an SC-FDMA symbol basis.

Figure 13:
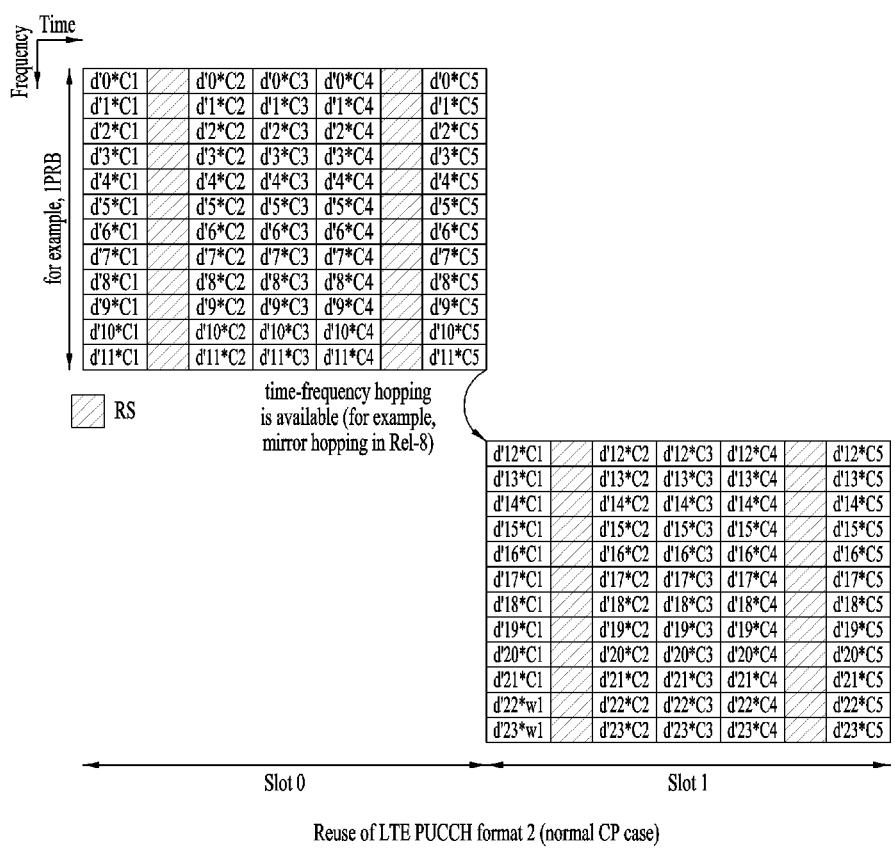

FIG. 13 illustrates a subframe-level structure of a PUCCH format 3. Referring to FIG. 13, in slot 0, symbol sequence {d'0, d'1, . . . , d'11} is mapped to a subcarrier of one SC-FDMA symbol and mapped to 5 SC-FDMA symbols according to block spreading using OCC C1 to C5. Similarly, in slot 1, a symbol sequence {d'12, d'13, . . . , d'23} is mapped to a subcarrier of one SC-FDMA symbol and mapped to 5 SC-FDMA symbols according to block-spreading using OCC C1 to C5. Here, symbol sequences {d'0, d'1, . . . , d'11} and {d'12, d'13, . . . , d'23} in slots 0 and 1 represent symbol sequence {d1, d2, . . . }, shown in FIG. 12, which has been subjected to FFT or FFT/IFFT. The entire symbol sequence {d'0, d'1, . . . , d'23} is generated by joint-coding one or more UCIs. The OCC may be changed based on slot and UCI data may be scrambled for each SC-FDMA symbol.

PUCCH format 3 resources may be explicitly allocated. In more detail, a PUCCH resource set is configured by a higher layer (e.g., RRC), and PUCCH resources to be actually used may be indicated by an ACK/NACK Resource Indicator (ARI) of the PDCCH.

Table 6 explicitly shows PUCCH resources for HARQ-ACK.

TABLE 6

| Value of HARQ-ACK resource for PUCCH (ARI) | $n_{PUCCH}$ |
|---|---|
| 00 | First PUCCH resource value configured by higher layer |
| 01 | Second PUCCH resource value configured by higher layer |
| 10 | Third PUCCH resource value configured by higher layer |
| 11 | Fourth PUCCH resource value configured by higher layer |

ARI represents an ACK/NACK resource indicator. In Table 6, the higher layer may include an RRC layer and an ARI value may be indicated by a PDCCH carrying a DL grant. For example, the ARI value may be designated using an SCell PDCCH and/or a Transmit Power Control (TPC) field of one or more PCell PDCCHs that do not correspond to a DAI initial value.

PUCCH format 4 is a PUCCH format that supports UCI transmission with a payload size larger than PUCCH format 3. The structure of PUCCH format 4 is basically the same as that of PUCCH format 3 except that block-spreading is not employed in PUCCH format 4. In addition, PUCCH format 4 resources may also be explicitly given. Specifically, a PUCCH resource set may be configured by a higher layer (e.g., RRC), and the PUCCH resource to be actually used may be indicated using the ARI value of the PDCCH.

In LTE-A, there are two methods of transmitting UCI and UL-SCH data at the same time. The first method is to transmit the PUCCH and the PUSCH at the same time, and the second method is to multiplex the UCI in the PUSCH as in legacy LTE. Whether the PUCCH and the PUSCH are allowed to be simultaneously transmitted may be set by a higher layer. When simultaneous transmission of PUCCH and PUSCH is enabled, the first method is used. When simultaneous transmission of PUCCH and PUSCH is disabled, the second method is used. The legacy LTE UEs cannot transmit PUCCH and PUSCH at the same time. Accordingly, when UCI (e.g., CQI/PMI, HARQ-ACK, RI, etc.) transmission is required in a subframe in which the PUSCH is transmitted, the method of multiplexing UCI in the PUSCH region is used. For example, when HARQ-ACK is to be transmitted in a subframe to which PUSCH transmission is allocated, the UE multiplexes the UL-SCH data and the HARQ-ACK before DFT-spreading, and transmits the control information and the data together on the PUSCH.

Figure 14:
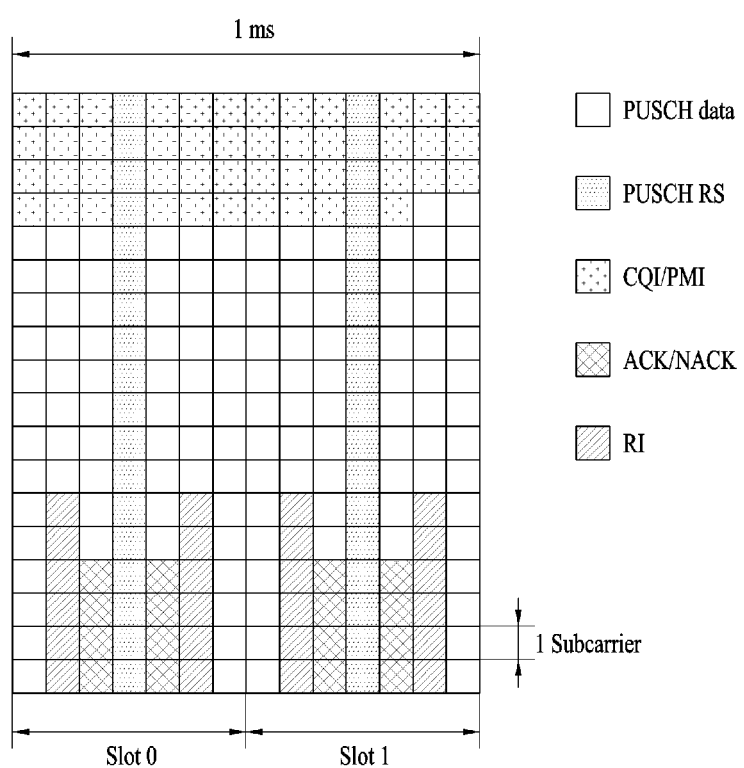
FIG. 14 is a conceptual diagram illustrating that control information and UL-SCH data are multiplexed on a Physical Uplink Shared CHannel (PUSCH).

FIG. 14 is a conceptual diagram illustrating that control information and UL-SCH data are multiplexed on a PUSCH. When transmitting control information in a subframe to which PUSCH transmission is allocated, the UE simultaneously multiplexes control information (UCI) and UL-SCH data prior to DFT spreading. The control information (UCI) includes at least one of CQI/PMI, HARQ ACK/NACK and RI. The number of REs used for transmission of each of CQI/PMI, ACK/NACK and RI is dependent upon Modulation and Coding Scheme (MCS) and offset values assigned for PUSCH transmission. The offset values allow different coding rates according to control information, and are semi-statically established by a higher layer (e.g., RRC) signal. UL-SCH data and control information are not mapped to the same RE. Control information is mapped to be contained in two slots of the subframe.

Referring to FIG. 14, CQI and/or PMI (CQI/PMI) resources are located at the beginning part of UL-SCH data resources, are sequentially mapped to all SC-FDMA symbols on one subcarrier, and are finally mapped in the next subcarrier. CQI/PMI is mapped from left to right within each subcarrier (i.e., in the direction of increasing SC-FDMA symbol index). PUSCH data (UL-SCH data) is rate-matched in consideration of the amount of CQI/PMI resources (i.e., the number of encoded symbols). The modulation order identical to that of UL-SCH data may be used in CQI/PMI. ACK/NACK is inserted into some resources of the SC-FDMA mapped to UL-SCH data through puncturing. ACK/NACK is located close to RS, fills the corresponding SC-FDMA symbol from bottom to top (i.e., in the direction of increasing subcarrier index) within the SC-FDMA symbol. In case of a normal CP, the SC-FDMA symbol for ACK/

NACK is located at SC-FDMA symbols #2 and #5 in each slot as can be seen from FIG. 14. Irrespective of whether ACK/NACK is actually transmitted in a subframe, the coded RI is located next to the symbol for ACK/NACK.

In addition, control information (e.g., information about QPSK modulation) may be scheduled in a manner that the control information can be transmitted over PUSCH without UL-SCH data. Control information (CQI/PMI, RI and/or ACK/NACK) is multiplexed before DFT spreading so as to retain low CM (Cubic Metric) single-carrier characteristics. Multiplexing of ACK/NACK, RI and CQI/PMI is similar to that of FIG. 14. The SC-FDMA symbol for ACK/NACK is located next to RS, and resources mapped to the CQI may be punctured. The number of REs for ACK/NACK and the number of REs for RI are dependent upon reference MCS (CQI/PMI MCS) and offset parameter. The reference MCS is calculated on the basis of CQI payload size and resource allocation. Channel coding and rate matching to implement control signaling having no UL-SCH data are identical to those of the other control signaling having UL-SCH data.

Figure 15:
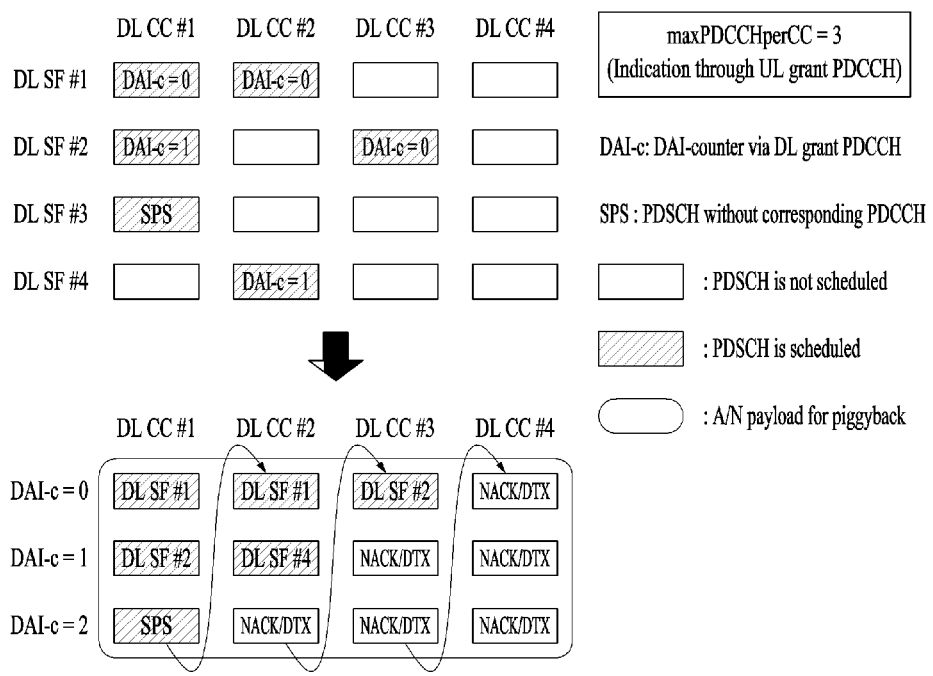
FIG. 15 shows an example of constructing an ACK/NACK payload in a conventional TDD CA.

FIG. 15 shows an example of constructing an ACK/NACK payload in a conventional TDD CA.

Referring to FIG. 15, the UE may adjust the total ACK/NACK payload size using the UL DAI value. UL DAI represents the DAI included in the UL grant (UG) DCI. That is, the UL DAI is included in the PDCCH for scheduling the PUSCH. Specifically, the UE may determine the size of an ACK/NACK payload (in other words, an ACK/NACK part) for each DL CC, considering the UL DAI value and the transmission mode and bundling of the corresponding CC. The UE may also determine the location of each ACK/NACK in the per-CC ACK/NACK payload using the DL DAI value(s) received at each DL CC. DL DAI represents the DAI included in the DL grant (DG) DCI. That is, the UL DAI is included in the PDCCH for scheduling the PDSCH or included in the PDCCH for instructing release of the DL SPS.

n more detail, it is assumed that the HARQ-ACK feedback bit for the c-th DL CC (or serving cell) is defined as $o_{c,0}^{ACK} o_{c,1}^{ACK}, \ldots, o_{c,O_c^{ACL}-1}^{ACK}$ (where c≥0). $O_c^{ACK}$ is the number (i.e., size) of HARQ-ACK payload bits for the c-th DL CC. If a transmission mode for supporting single transmission block (TB) transmission is configured in the c-th DL CC or if the spatial bundling is applied to the c-th DL CC, $O_c^{ACK}$ may be identical to $B_c^{DL}$ as denoted by $O_c^{ACK}=B_c^{DL}$. In contrast, if a transmission mode for supporting transmission of multiple transmission blocks (e.g., two TBs) is configured in the c-th DL CC or if no spatial bundling is applied to the c-th DL CC, $O_c^{ACK}$ may be identical to $2B_c^{DL}$ as denoted by $O_c^{ACK}=2B_c^{DL}$. $B_c^{DL}$ is the number (i.e., maxPDCCHperCC) of DL subframes requiring ACK/NACK feedback in the c-th DL CC. If HARQ-ACK is transmitted through a PUSCH scheduled by a PDCCH, maxPDCCHperCC may be indicated by the value of a UL-DAI field. In accordance with this example, when deciding the 'maxPDCCHperCC' value, the BS may further consider a SPS PDSCH (that is, maxPDCCHperCC=3). In contrast, if HARQ-ACK is transmitted through a PUCCH or a SPS PUSCH, maxPDCCHperCC is denoted by M (i.e., mxPDCCHperCC=M).

If a transmission mode for supporting transmission of a single transmission block is established in the c-th DL CC, or if spatial bundling is applied to the c-th DL CC, the position of each ACK/NACK in per-CC HARQ-ACK payload is given as $o_{c,DAI(k)-1}^{ACK}$. DAI(k) indicates a DL DAI value of the PDCCH detected at the DL subframe (n−k). In contrast, if a transmission mode for supporting transmission of multiple transmission blocks (e.g., two transmission blocks) is configured in the c-th DL CC and no spatial bundling is applied to the c-th DL CC, the position of each ACK/NACK in per-CC HARQ-ACK payload is denoted by $o_{c,2DAI(k)-2}^{ACK}$ and $o_{c,2DAI(k)-1}^{ACK}$. $o_{c,2DAI(k)-2}^{ACK}$ is RQ-ACK for the codeword 0, and $o_{c,2DAI(k)-1}^{ACK}$ is a HARQ-ACK for the codeword 1.

On the other hand, according to Option C, if SPS PDSCH is present, a HARQ-ACK position for SPS PDSCH may be located at $o_{c,O_c^{ACL}-1}^{ACK}$ in a HARQ-ACK payload for the corresponding CC. CC where the SPS PDSCH is present may be limited to a DL PCC.

Thereafter, the UE allows HARQ-ACK payload (i.e., HARQ-ACK part for each CC) for multiple CCs to be sequentially concatenated with each other according to the cell index. Preferably, the HARQ-ACK payload may be concatenated with each other in ascending numerical order of cell index. The entire HARQ-ACK payload configured by concatenation can be transmitted through a PUCCH or PUSCH upon completion of signal processing (e.g., channel coding, modulation, scrambling, etc.).

Embodiment: ACK/NACK (A/N) Transmission in Enhanced CA (eCA)

As described with reference to FIG. 15, in the existing CA system based on TDD, a plurality of HARQ-ACK feedbacks for DL data reception in a plurality of cells may be transmitted through one UL SF. In addition, the HARQ-ACK feedback corresponding to each cell may include a plurality of HARQ-ACKs (A/N) for DL data reception in a specific DL SF set (hereinafter referred to as a bundling window) in a corresponding cell. In addition, in DL grant (DG) DCI for scheduling each cell, a counter value indicating the scheduling order of the corresponding DL data within the bundling window of the corresponding cell may be transmitted through DAI (i.e., DL DAI), and a specific value selected from the base station may also be transmitted in the UL grant (UG) DCI through DAI (i.e., UL DAI). Accordingly, the UE may arrange A/N bits in order of the DL DAI values when the A/N payloads (per cell) are configured on the PUCCH/PUSCH. In particular, for A/N transmission on the PUSCH, the A/N feedback size may be reduced by constructing a payload only for DL DAI values below UL DAI (for each cell considering the UL DAI as the maximum value of DL DAI).

In a next-generation system, CA for a larger number of cells (e.g., 32 cells) is considered. In this case, the A/N feedback size for one UL SF may greatly increase in proportion to the number of cells subject to CA. DL scheduling may not be performed for all cells subject to CA in each SF even if the UE has CA set for many cells. In other words, when there is not much DL traffic, DL scheduling may be performed only for a specific part of the cells subject to CA. Therefore, it may be effective to reduce the total A/N feedback size by omitting configuration/transmission for the A/N corresponding to the unscheduled cells as much as possible in terms of A/N feedback transmission performance and UCI transmission resource overhead.

Hereinafter, a method for efficiently transmitting uplink control information, preferably ACK/NACK (i.e., HARQ-ACK), when a plurality of cells is aggregated for one UE.

For simplicity, it is assumed that, when a cell is set to the non-MIMO mode, at most one transport block (TB) (equivalent to a codeword) can be transmitted in subframe k of a corresponding cell. If the cell is set to the MIMO mode, it is assumed that a maximum of m (e.g., two) transport blocks (or codewords) can be transmitted in SF #k of the corresponding cell. Whether or not the cell is set to the MIMO mode may be identified using the transmission mode set by a higher layer. The number of ACK/NACKs (i.e., ACK/NACK bits, HARQ-ARQ bits) for the corresponding cell is assumed to be 1 (non-MIMO) or m (MIMO) regardless of the number of actually transmitted transport blocks (or codewords).

First, terms used in this specification are summarized below.

HARQ-ACK: Represents a reception response result to DL transmission (e.g., a PDSCH or a DL SPS release PDCCH), namely, ACK/NACK/DTX response (simply, ACK/NACK response). The ACK/NACK/DTX response refers to ACK, NACK, DTX or NACK/DTX. HARQ-ACK for a specific cell or the HARQ-ACK of a specific cell represents an ACK/NACK response to a DL signal (e.g., PDSCH) associated with (e.g., scheduled for) the cell. The PDSCH may be replaced by a TB or codeword. HARQ-ACK is fed back for (i) an SPS PDSCH, (ii) a PDSCH (hereinafter, normal PDSCH, non-SPS PDSCH) scheduled by the PDCCH (DG DCI), and (iii) a DL SPS release PDCCH (DG DCI). The SPS PDSCH does not accompany a corresponding PDCCH (DG DCI).

DL SPS release PDCCH: Represents a PDCCH indicating DL SPS release.

SPS PDSCH: Represents a PDSCH transmitted on DL by using a resource semi-statically configured by SPS. The SPS PDSCH has no corresponding DL grant PDCCH (DG DCI). In this specification, SPS PDSCH is used interchangeably with PDSCH without (w/o) PDCCH and SPS-based PDSCH.

SPS PUSCH: Represents a PUSCH transmitted on UL by using a resource semi-statically configured by SPS. The SPS PUSCH has no corresponding UL grant PDCCH (UG DCI). In this specification, SPS PUSCH is used interchangeably with PUSCH w/o PDCCH.

ARI (ACK/NACK Resource Indicator): Used to indicate a PUCCH resource. In one example, the ARI may be used to indicate a resource variant value (e.g., offset) for a specific PUCCH resource (group) (configured by a higher layer). As another example, an ARI may be used to signal a specific PUCCH resource (group) index within a set of PUCCH resources (groups) (configured by a higher layer). The ARI may be included in the TPC (Transmit Power Control) field of the PDCCH corresponding to the PDSCH on the SCell. PUCCH power control is performed through the TPC field in the PDCCH (i.e., the PDCCH corresponding to the PDSCH on the PCC) for scheduling the PCell. In addition, the ARI may be included in the TPC field of the remaining PDCCHs except for the PDCCH for scheduling a specific cell (e.g., PCell) while having an initial value of a DAI (Downlink Assignment Index). ARI is used interchangeably with HARQ-ACK resource indication value.

DAI (Downlink Assignment Index): Included in the DCI transmitted through the PDCCH. The DAI may indicate an order value or a counter value of the PDCCH. The DAI is used for TDD operation in legacy LTE/LTE-A. For simplicity, the DAI of the DL grant PDCCH is referred to as DL DAI and is referred to as the UL DAI of the DAI in the UG PDCCH.

t-DAI: Represents DAI for signaling DL scheduling information in the time domain (i.e., SF domain) within the bundling window for each cell. This corresponds to the existing DL DAI (see DAI-c in FIG. 15). In the present invention, the t-DAI may be modified to signal information different from the conventional one.

(A/N) bundling window: The UE transmits HARQ-ACK feedback for DL data reception in the bundling window through the UL SF. When HARQ-ACK feedback is transmitted in SF #n, the bundling window is defined as SF # n-k. K=4 in FDD, and k in TDD is defined by DASI(K:$\{k_0, k_1, \ldots k_{M-1}\}$) in Table 5. The bundling window may be defined cell by cell.

PDCCH (DG DCI) for scheduling cell #A, cell #A scheduling PDCCH (DG DCI): Represents PDCCH (DG DCI) for scheduling the PDSCH on cell #A. That is, this represents PDCCH (DG DCI) corresponding to the PDSCH on CC #A, or a DG SPS release PDCCH (DG DCI) transmitted on CC #A.

Scheduling for cell #A, cell #A scheduling: Represents PDSCH or DG SPS release PDCCH transmission on cell #A. Alternatively, it may refer to an operation or process related to transmitting a PDSCH or DG SPS release PDCCH on cell #A. For example, it may mean transmitting a PDCCH for scheduling a PDSCH in consideration of PDSCH transmission on cell #A.

CSS-based scheduling: Refers to transmission of (i) PDCCH corresponding to PDSCH or (ii) DG SPS release PDCCH, in the CSS. The CSS-based PDSCH refers to a PDSCH scheduled by the PDCCH transmitted in the CSS.

SPS-based scheduling: Depending on context, may mean DG SPS release PDCCH transmission, SPS PDSCH transmission or SPS PUSCH transmission.

LCell and UCell: LCell refers to a cell operating in a licensed band and UCell refers to a cell operating in an unlicensed band. In the UCell, communication is performed based on carrier sensing.

A method of efficiently performing A/N feedback (e.g., A/N feedback size reduction) on the basis of DAI signaling in DL/UL grant DCI in a CA situation will be proposed. Specifically, a method of signaling a DAI (through DL/UL grant DCI) and a method of configuring an A/N payload (on a PUCCH/PUSCH) based on the DAI signaling method will be proposed. Here, the DAI (referred to as counter-DAI hereinafter) can signal a (scheduling) counter value indicating the order of a cell scheduled by DL grant DCI corresponding thereto among all (scheduled) cells on the basis of a specific criterion (e.g., cell index order). In a TDD situation, a counter-DAI can signal a (scheduling) counter value counted in a cell first manner by combining a cell (i.e., CC) domain and an SF domain. For example, the counter-DAI can indicate the order of a cell scheduled by DG DCI among all cells, that is, a scheduling order value, in a cell/SF unit. In the cell first manner, a scheduling order in a cell/SF unit may be counted in the order of increasing cell (i.e., CC) index and then increasing an SF index within a bundling window. In the present invention, TDD (or FDD) may include a case in which a PCell or a cell which performs A/N transmission operates according to TDD (or FDD), and a DL SF may include an S SF configured for TDD.

Method 1: Last (Scheduled) DAI Group (Last-DG) Indication

A method of indicating whether scheduling from DL grant DCI corresponds to a last (scheduled) DAI group through the DL grant DCI in addition to the counter-DAI is proposed. Prior to description, the counter-DAI may be signaled through a field (i.e., DAI field) composed of a limited number of bits (e.g., 2 bits) in DL grant DCI and thus (scheduling) counter values may be mapped to one DAI bit combination (i.e., DAI state or DAI value) in an overlapping manner through an appropriate modulo operation. For example, if a 2-bit DAI field is configured, counter values 1/5/9 can be mapped to DAI=1 or DAI state 00, counter values 2/6/10 can be mapped to DAI=2 or DAI state 01, counter values 3/7/11 can be mapped to DAI=3 or DAI state 10, and counter values 0/4/8 can be mapped to DAI=4 or DAI state 11 in an overlapping manner through modulo-4 operation.

Here, a DAI group may refer to a DAI state sequence including DAI states consecutive on a counter only once. For example, a minimum DAI (e.g., state 00) to a maximum DAI (e.g., state 11) can be automatically set as a DAI group or an eNB can determine a range of DAIs (states) to be set as a DAI group. Specifically, a sequence corresponding to 1/2/3/4 on the basis of counter-DAI values (00/01/10/11 on the basis of states) may be (automatically) set to a DAI group, or a sequence corresponding to 3/4/1/2 on the basis of counter-DAI values (10/11/00/01 on the basis of states) may be set to a DAI group (by an eNB).

Under the aforementioned conditions, whether scheduling from DL grant DCI corresponds to the last (scheduled) DAI group on a (scheduling) counter (referred to as a last-DG ON state hereinafter) or not (referred to as a last-DG OFF state) may be indicated through the DL grant DCI (e.g., using 1-bit). For example, when the same DAI group as that in the aforementioned example of automatically setting a DAI group is assumed in a situation in which scheduling corresponding to counter values of 1 to 12 is performed, 4 pieces of DL grant DCI including the first DAI group corresponding to counter values=1/2/3/4 and 4 pieces of DL grant DCI including the second DAI group corresponding to counter values=5/6/7/8 can indicate last-DG OFF (e.g., bit 0), whereas 4 pieces of DL grant DCI including the last DAI group corresponding to counter values=9/10/11/12 can indicate last-DG ON (e.g., bit 1) according to the proposed method.

Meanwhile, only (initial) part of the entire DAI state sequence (e.g., 00/01/10/11 or 10/11/00/01) configured for the last (scheduled) DAI group may be transmitted through the last (scheduled) DAI group at a specific time according to scheduling situation of an eNB. Otherwise, the entire DAI state sequence configured for the last (scheduled) DAI group may be transmitted from the viewpoint of an eNB, whereas only (initial) part of the DAI state sequence may be received due to failure in DL grant DCI detection from the viewpoint of a UE. In this case, the UE may configure an A/N bit (e.g., as NACK or DTX) for the remaining counter values of the DAI state sequence which are not included in the last (scheduled) DAI group and transmit the A/N bit in order to avoid inconsistency between the UE and the eNB in terms of an A/N payload length/configuration. Here, "the remaining counter values of the DAI state sequence" may be limited up to the highest A/N bit index corresponding to a maximum A/N payload size which can be transmitted in a given PUCCH format or a maximum A/N payload size set for the UE. For example, a sequence corresponding to 1/2/3/4 on the basis of counter-DAI values (00/01/10/11 on the basis of states) is set to a DAI group, and the UE can detect only DL grant DCI corresponding to ½ in the last (scheduled) DAI group on the basis of counter-DAI values. In this case, "the remaining counter values of the DAI state sequence" is ¾, and an A/N bit corresponding thereto in a maximum A/N payload size can be configured as NACK or DTX.

Meanwhile, although the eNB has transmitted DL grant DCI (i.e., last-DG ON) indicting the last (scheduled) DAI group, the UE may fail in detection of the DL grant DCI and thus only DL grant DCI (i.e., last-DG OFF) which does not correspond to the last (scheduled) DAI group may be present. In this case, the UE may configure an A/N bit (e.g., as NACK or DTX) for counter values corresponding to the next DAI group in addition to the last DAI group indicated as last-DG OFF and transmit the A/N bit in order to avoid inconsistency between the UE and the eNB in terms of an A/N payload length/configuration. This is because the DAI group following the finally detected DAI group (last-DG OFF) can be assumed to be last-DG ON when it is considered/assumed that the UE does not fail in detection of 4 pieces of DL grant DCI. Here, "counter values corresponding to the next DAI group" may be limited up to the highest A/N bit index corresponding to a maximum A/N payload size which can be transmitted in a given PUCCH format or a maximum A/N payload size set for the UE.

In the present invention, the counter-DAI can signal a TB-level (scheduling) counter indicating the order of a TB scheduled in the cell domain (and/or the SF domain) instead of a cell/SF-level (scheduling) counter indicating the order of a scheduled cell/SF. In this case, operations of setting a TB-level DAI group and configuring/transmitting A/N on the basis of last (scheduled) DAI group indication may be performed using the same principle as the aforementioned proposition. In addition, when DAIs are independently signaled for CGs grouped on the basis of a specific criterion (e.g., CGs having the same maximum number of transmittable TBs or CGs having the same carrier type (e.g., LCell or UCell)), the proposed last DAI group indication based A/N configuration/transmission methods may be applied per CG.

Method 2: Last Scheduling (Grant) Order Indication

In addition to the counter-DAI, a method of indicating how many scheduling operations are present between scheduling corresponding to DL grant DCI and the last scheduling (equivalently, how many scheduling operations including scheduling corresponding to the DL grant DCI remain) through the DL grant DCI is proposed. For example, it is possible to indicate whether scheduling corresponding to DL grant DCI corresponds to state-1) last scheduling (or the number of remaining scheduling operations is 1), state-2) second to the last scheduling (or the number of remaining scheduling operations is 2), state-3) third to the last scheduling (or the number of remaining scheduling operations is 3) or state-4) scheduling prior to the third to the last scheduling (or the number of remaining scheduling operations exceeds 3) through 2 bits (4 states) in the DL grant DCI (referred to as last-order indicator hereinafter).

For example, when a 2-bit last-order indicator is applied in a situation in which 10 scheduling operations corresponding to counter values of 1 to 10, 7 pieces of DL grant DCI corresponding to counter values=1/2/3/4/5/6/7 can indicate state-4, whereas DCL grant DCI corresponding to counter values=8/9/10 can sequentially indicate state-3, state-2 and state-1. As another example, when only two scheduling operations corresponding to counter values of 1 and 2 are performed, DL grant DCI corresponding to counter values=1/2 can sequentially indicate state-2 and state-1.

Based on last-order signaling, a UE may determine/configure an A/N payload (size) on the assumption that the UE does not fail in detection of 4 pieces of DL grant DCI. Upon reception of only DL grant DCI indicated as state-4, the UE may configure an A/N bit (as NACK or DTX) for 3 counter values (a maximum value among these values) (corresponding to 3 states of state-3, state-2 and state-1) following the received last counter value and transmits the A/N bit. In addition, when the order of state-4, state-3, state-2 and state-1 is considered as a state order, the UE may configure an A/N bit (as NACK or DTX) for a maximum value among counter values corresponding to the remaining states following the received last state (from counter=1) and transmit the A/N bit upon reception of only DL grant DCI indicated as a state other than state-4. Here, "counter values corresponding to the remaining states" may be limited up to a highest A/N bit index corresponding to a maximum A/N payload size transmittable in a given PUCCH format or a maximum A/N payload size set for the UE.

For example, when only DL grant DCI corresponding to counter=2 and state-1 is received, the UE can configure/transmit an A/N bit only for counter=2 (from counter=1) because there is no remaining state after the corresponding state. As another example, when only DL grant DCI corresponding to counter=1 and state-3 is received, the UE can configure/transmit an A/N bit for a maximum value among counter values corresponding to state-2 and state-1 after the corresponding state, that is, counter value=3. As another example, when DCI corresponding to counter=3 and state-3 and DCI corresponding to counter=4 and state-2 are received, the UE can configure/transmit an A/N bit for up to counter=5 corresponding to state-1 after the last received state-2.

In the present invention, the counter-DAI can signal a TB-level (scheduling) counter indicating the order of a TB scheduled in the cell domain (and/or the SF domain) instead of a cell/SF-level (scheduling) counter indicating the order of a scheduled cell/SF. In this case, A/N configuration/transmission operations based on TB-level last-order indication may be performed using the same principle as the aforementioned proposition. In addition, when DAIs are independently signaled for CGs grouped on the basis of a specific criterion (e.g., CGs having the same maximum number of transmittable TBs or CGs having the same carrier type (e.g., LCell or UCell)), the proposed last scheduling order indication based A/N configuration/transmission methods may be applied per CG.

Method 3: Total Scheduling (Grant) Number Indication

In addition to the counter-DAI, a method of indicating a total number of scheduling operations including scheduling corresponding to DL grant DCI in a specific SF duration (within a DL SF group corresponding to the same A/N transmission timing, that is, a bundling window) (equivalently, a last (scheduling) counter value (a DAI value corresponding thereto) in the SF period) (in a TDD situation) through the DL grant DCI (referred to as total-DAI hereinafter) is proposed. Here, an SF duration which is a target of total-DAI value calculation may include at least a period from the initial SF to a DL grand DCI transmission SF (within the bundling window). In addition, the SF immediately after the DCI transmission SF or a plurality of consecutive SFs including the same (referred to as expected SFs) may be additionally included. Further, when a total-DAI calculation target SF duration in DCI transmission SFs additionally includes expected SFs, a total-DAI for DCI transmission in the expected SFs may be calculated for the same period as the total-DAI calculation target SF duration.

For example, when a situation in which 7 scheduling operations, 6 scheduling operations, 5 scheduling operations and 1 scheduling operation are respectively performed through SF #1, SF #2, SF #3 and SF #4 is assumed, an SF duration for a total-DAI in SF #1 can be set to SF #1 (and thus total-DAI=7) and an SF duration for SF #2 can be set to SF #1 to SF #2 (and thus total-DAI=13), whereas an SF duration for a total-DAI in SF #3 can be set to SF #1 to SF #4 including expected SF #4 (and thus total-DAI=19) and an SF duration for a total-DAI in SF #4 can be set to SF #1 to SF #4 which are the same as the SF duration in the case of SF #3 (and thus total-DAI=19) according to the proposed method. As another example, when 2, 3 and 7 scheduling operations are respectively performed through SF #1, SF #2 and SF #3, an SF duration for a total-DAI in SF #1 can be set to SF #1 to SF #2 including expected SF #2 (and thus total-DAI=5) and an SF duration for a total-DAI in SF #2 can be set to SF #1 to SF #2 which are the same as the SF duration in the case of SF #1 (and thus total-DAI=5), whereas an SF duration for a total-DAI in SF #3 can be set to SF #1 to SF #3 (and thus total-DAI=12).

Alternatively, a total number of scheduling operations from the initial SF to the SF immediately after the corresponding DCI transmission SF can be signaled as a total-DAI through DL grant DCI corresponding to the initial SF to the (N−1)-th SF (when a bundling window composed of N SFs is assumed). Further, a total number of scheduling operations from the initial SF to the corresponding DCI transmission SF can be signaled as a total-DAI through DL grant DCI corresponding to the last N-th SF.

In the present invention, the counter-DAI can signal a TB-level (scheduling) counter indicating the order of a TB scheduled in the cell domain (and/or the SF domain) instead of a cell/SF-level (scheduling) counter indicating the order of a scheduled cell/SF. In this case, A/N configuration/transmission operations based on TB-level total-DAI indication may be performed using the same principle as the aforementioned proposition. In addition, when DAIs are independently signaled for CGs grouped on the basis of a specific criterion (e.g., CGs having the same maximum number of transmittable TBs or CGs having the same carrier type (e.g., LCell or UCell)), the proposed total scheduling number based A/N configuration/transmission methods may be applied per CG.

In the case of A/N payload configuration/transmission methods based on the counter-DAI (and/or a total number of scheduling operations, a last scheduling counter value or information through which the same can be inferred (collectively referred to as an S-info indicator hereinafter) including a total-DAI, a last-order indicator or a last-DG indicator), it may be necessary to limit a minimum payload size (i.e., minimum size) in a given PUCCH format when characteristics and performance of a channel coding scheme are considered. Accordingly, configuration and transmission of an A/N payload corresponding to a larger one between an actual payload size determined on the basis of the counter-DAI (and/or S-info indicator) (i.e., actual A/N size) and the aforementioned minimum size can be considered (e.g., max (actual A/N size, minimum size)). Here, when the minimum size>the actual A/N size, A/N bits corresponding to (minimum size−actual A/N size) in the A/N payload may be configured as/mapped to NACK or DTX.

Additionally, when the probability of failure of detection of L pieces of DL grant DCI (consecutive on a counter) is considerably low and thus is ignorable, and the UE operates on the assumption that such a case does not occur, the following method can be considered. First, ARI or a TCP command (including a counter-DAI) can be signaled (by being included in a TPC field of corresponding DCI) through DL grant DCI corresponding to counter values of 1 to L, and an S-info indicator may not be signaled through the corresponding DCI. Then, an S-info indicator (including a counter-DAI) can be signaled (by being included in the TPC field of the corresponding DCI) through DL grant DCI corresponding to counter values from (L+1), and ARI or a TPC command may not be signaled through the corresponding DCI. In this case, counter=1 to counter=K can be set to a minimum size in consideration of a case in which the DCI corresponding to counter values of 1 to L does not include an S-info indicator and detection of DCI corresponding to counter values=(L+1) to K (here, L<K≤maximum counter value, e.g., K=2L−1 or K=2K) fails (e.g., L=4 can be set/applied).

More specifically, case #1) when the counter-DAI is signaled/applied only to SCells other than a PCell, a TCP command can be signaled through DL grant DCI which schedules the PCell, an ARI can be signaled through DCI corresponding to counter values=1 to L, and an S-info indicator can be signaled through DCI corresponding to remaining counter values including counter=(L+1). In this case, up to counter=K (from counter=1) including A/N corresponding to the PCell can be set to a minimum size. Case #2) when the counter-DAI is signaled/applied to all cells including a PCell, a TPC command can be signaled through DL grant DCI which schedules the PCell and corresponds to counter=1, an ARI can be signaled through DCI which schedules SCells and corresponds to counter=1 or DCI corresponding to counter=2 to counter=L, and an S-info indicator can be signaled through DCI corresponding to remaining counter values including counter=(L+1). In this case, up to counter=K (from counter=1) can be set to a minimum size.

Alternatively, a counter-DAI value represented by ceiling [log 2(M)] or ceiling [log 2(M/2)] bits can be signaled through DCI corresponding to counter values=1 to M. A counter-DAI value represented by ceiling [log 2(N)] or ceiling [log 2(N/2)] bits can be signaled through DCI corresponding to the remaining counter values, that is, counter values=M+1 to N (maximum counter value). Here, N may be set to a total number of cells (or SFs) which configure CA or a specific value (e.g., 32). ceiling [ ] represents a ceiling function. In an implementation example, an ARI or a TPC command is signaled through a TPC field in the case of DCI corresponding to counter values=1 to M, whereas an ARI or a TPC command may not be signaled in the case of DCI corresponding to counter values=M+1 to N. Accordingly, counter values=1 to M can be signaled through a counter-DAI field composed of ceiling [log 2(M)] or ceiling [log 2(M/2)] bits, whereas counter values=M+1 to N can be signaled through a combination of the counter-DAI field composed of ceiling [log 2(M)] or ceiling [log 2(M/2)] bits and the TPC field.

Alternatively, the number of bits representing one counter value or the size of the counter-DAI field added for counter value signaling may be set in proportion to a total number of cells (or SFs) configuring CA or may be directly set by an eNB. With respect to DL grant DCI transmitted through CSS, a method of signaling no counter value in the case of FDD and signaling counter values through the conventional t-DAI field in the case of TDD may be considered. Here, the number of bits representing a counter value signaled in DL grant DCI transmitted through USS or a counter-DAI field size (e.g., N bits) may be greater than the conventional t-DAI field size (e.g., M bits). In this case, when counter values corresponding to CSS based DL grant DCI are determined, a most significant bit (MSB) part corresponding to N-M bits may be regarded as a fixed specific value (e.g., bit 0) and connected with M-bits in the t-DAI field to determine the corresponding counter values.

Figure 16:
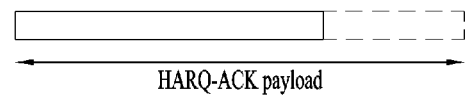
FIG. 16 illustrates ACK/NACK transmission according to an embodiment of the present invention.

FIG. 16 illustrates ACK/NACK transmission according to an embodiment of the present invention. It is assumed that 4 cells which are cells 1, 2, 3 and 4 are carrier-aggregated for a UE and a bundling window is composed of SFs #1 to #3. Referring to FIG. 16, cell/SF resources of (Cell 1, SF #1), (Cell 2, SF #1), (Cell 4, SF #2), (Cell 1, SF #3) and (Cell 3, SF #3) are scheduled and other cell/SF resources are not scheduled. Here, scheduling refers to execution of DL transmission which requires HARQ-ACK feedback in a corresponding cell/SF resource, and DL transmission which requires HARQ-ACK feedback includes transmission of a PDSCH and an SPS release PDCCH. For example, PDSCH transmission may be performed in (Cell 2, SF #1). A PDCCH which schedules a PDSCH may be transmitted in (Cell 2, SF #1) (self-scheduling) or in (Cell X, SF #1) (cross-carrier scheduling) according to scheduling scheme. A cell X refers to a scheduling cell of cell 1. An SPS PDSCH does not accompany the PDCCH. The figure illustrates only a case in which a PDSCH (and SPS release PDCCH) corresponding to a PDCCH (DG DCI) is scheduled. A counter-DAI (c-DAI) indicates (scheduling) counter values in the cell first manner, and thus 1 to 5 are represented in the order of (Cell 1, SF #1)=>(Cell 2, SF #1)=>(Cell 4, SF #2)=>(Cell 1, SF #3)=>(Cell 3, SF #3).

In addition, a PDCCH which schedules each cell/SF further includes an S-info indicator S-info. S-info can signal last (scheduled) DAI group (last-DG) indication (method 1), last scheduling (grant) order indication (method 2), and total scheduling (grant) number indication (method 3) according to proposition of the present invention. The counter-DAI/S-info is used for a HARQ-ACK transmission procedure (HARQ-ACK payload configuration, HARQ-ACK bit position determination, DTX detection, etc.). For example, the positions of HARQ-ACK bits in an HARQ-ACK payload can be determined in the order of counter-DAIs, and the size of the HARQ-ACK payload can be determined in consideration of S-info, a maximum A/N payload size which can be transmitted in a given PUCCH format or a maximum A/N payload size set for the UE, a minimum A/N payload size in the given PUCCH format, etc. Specifically, the HARQ-ACK payload may include actual HARQ-ACK bits and 0 or more non-actual HARQ-ACK bits. Here, the actual HARQ-ACK bits may be arranged in the order of counter-DAIs from the MSB and the size of the non-actual HARQ-ACK bits may be determined in consideration of S-info, the maximum A/N payload size, the minimum A/N payload size, etc.

When HARQ-ACK is transmitted through a PUCCH, PUCCH transmission power increases in proportion to the number of HARQ-ACK bits. Meanwhile, the non-actual HARQ-ACK bits are dummy information added to prevent inconsistency of A/N payload sizes between an eNB and a UE, and thus the number of non-actual HARQ-ACK bits may be excluded from a PUCCH transmission power determination procedure. That is, only the number of actual HARQ-ACK bits can be reflected in the PUCCH transmission power determination procedure. Accordingly, higher transmission power can be used for PUCCH transmission in the case of a larger number of actual HARQ-ACK bits even if HARQ-ACK payloads have the same length.

Figure 17:
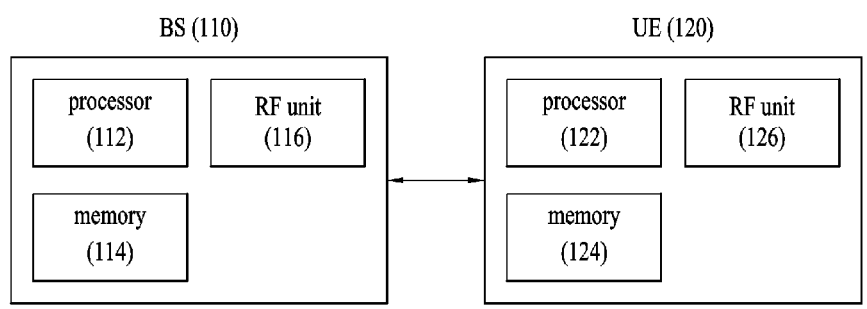
FIG. 17 exemplarily shows a Base Station (BS) and a user equipment (UE) applicable to the embodiments of the present invention.

FIG. 17 illustrates a BS, a relay and a UE applicable to the present invention.

Referring to FIG. 17, a wireless communication system includes a BS 110 and a UE 120. When the wireless communication system includes a relay, the BS or UE may be replaced by the relay.

The BS includes a processor 112, a memory 114, an RF unit 116. The processor 112 may be configured to implement the procedures and/or methods proposed by the present invention. The memory 114 is connected to the processor 112 and stores information related to operations of the processor 112. The RF unit 116 is connected to the processor 112, transmits and/or receives an RF signal. The UE 120 includes a processor 122, a memory 124, and an RF unit 126. The processor 112 may be configured to implement the procedures and/or methods proposed by the present invention. The memory 124 is connected to the processor 122 and stores information related to operations of the processor 122. The RF unit 126 is connected to the processor 122, transmits and/or receives an RF signal.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the BS may be performed by an upper node of the BS as the case may be. In other words, it will be apparent that various operations performed for communication with the UE in the network which includes a plurality of network nodes along with the BS may be performed by the BS or network nodes other than the BS. The BS may be replaced with terms such as fixed station, Node B, eNode B (eNB), and access point. Also, the term UE may be replaced with terms such as UE (MS) and mobile subscriber station (MSS).

The embodiments according to the present invention may be implemented by various means, for example, hardware, firmware, software, or combinations thereof. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention is applicable to a UE, BS or other devices of a wireless mobile communication system. Specifically, the present invention is applicable to a method for transmitting uplink control information and an apparatus for the same.

The invention claimed is:

1. A method of transmitting a hybrid automatic repeat request request-acknowledgement (HARQ-ACK) by a user equipment (UE) in a wireless communication system, the method comprising:
receiving a physical downlink control channel (PDCCH) having a downlink assignment index (DAI) and DAI group indication information within a subframe (SF) #n−k;
configuring a HARQ-ACK payload using the DAI and the DAI group indication information; and
transmitting the HARQ-ACK payload in an SF #n,
wherein a value of the DAI includes a scheduling order value in a cell/SF unit associated with the first PDCCH in the SF #n−k, the scheduling order value in a cell/SF unit is counted in a cell first manner in a cell/SF domain, the DAI group indication information includes whether the PDCCH is related to a last DAI group, one DAI group is composed of a plurality of consecutive DAI values, k is an element of a set K for a reference uplink-downlink (UL-DL) configuration, the set K is defined as a set including at least one of {4, 5, 6, 7, 8, 9, 11, 12, 13}, and the PDCCH that schedules a PDSCH transmission or a semi-persistent scheduling (SPS) release is present in a subframe #n−k, and
wherein, when a PDCCH related to the last DAI group is not detected in the SF #n−k, the HARQ-ACK payload further includes a HARQ-ACK response related to the next DAI group in addition to a last received DAI group, and the HARQ-ACK response is set to a negative acknowledgement (HACK) or discontinuous transmission (DTX).

2. The method according to claim 1, wherein 4 values of the DAI are circularly repeated and the one DAI group is composed of 4 consecutive DAI values.

3. The method according to claim 1, wherein the HARQ-ACK payload includes a HARQ-ACK response to the PDSCH or a HARQ-ACK response to the PDCCH indicating the SPS release.

4. A user equipment (UE) configured to transmit hybrid automatic repeat request acknowledgement (HARQ-ACK) in a wireless communication system, the UE comprising:
a transceiver; and
a processor,
wherein the processor is configured to:
control the transceiver to receive a physical downlink control channel (PDCCH) having a downlink assignment index (DAI) and DAI group indication information within a subframe (SF) #n−k;
configure a a HARQ-ACK payload using the DAI and the DAI group indication information; and
control the transceiver to transmit the HARQ-ACK payload in an SF #n,
wherein a value of the DAI includes a scheduling order value in a cell/SF unit associated with the PDCCH in the SF #n−k, the scheduling order value in a cell/SF unit is counted in a cell first manner in a cell/SF domain, the DAI group indication information includes whether the PDCCH is related to a last DAI group, one DAI group is composed of a plurality of consecutive DAI values, k is an element of a set K for a reference uplink-downlink (UL-DL) configuration, the set K is defined as a set including at least one of {4, 5, 6, 7, 8, 9, 11, 12, 13}, and the PDCCH that schedules a PDSCH transmission or a semi-persistent scheduling (SPS) release is present in a subframe #n−k, and wherein, when a PDCCH related to the last DAI group is not detected in the SF #n−k, the HARQ-ACK payload further includes a HARQ-ACK response related to the next DAI group in addition to a last received DAI group, and the HARQ-ACK response is set to a negative acknowledgement (HACK) or Discontinuous Transmission (DTX).

5. The UE according to claim 4, wherein 4 values of the DAI are circularly repeated and the one DAI group is composed of 4 consecutive DAI values.

6. The UE according to claim 4, wherein the HARQ-ACK payload includes a HARQ-ACK response to the PDSCH or a HARQ-ACK response to the PDCCH indicating the SPS release.

* * * * *